(12) United States Patent
Chang et al.

(10) Patent No.: US 8,787,923 B2
(45) Date of Patent: Jul. 22, 2014

(54) DEVICE FOR MANAGING OF BASE STATION AND METHOD FOR MANAGING THEREOF

(75) Inventors: Sung Cheol Chang, Daejeon (KR); Won-Ik Kim, Daejeon (KR); Sung Kyung Kim, Daejeon (KR); Hyun-Jae Kim, Daejeon (KR); Chul Sik Yoon, Daejeon (KR); Jee Hwan Ahn, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 615 days.

(21) Appl. No.: 12/799,654

(22) Filed: Apr. 29, 2010

(65) Prior Publication Data

US 2011/0028175 A1    Feb. 3, 2011

(30) Foreign Application Priority Data

Apr. 29, 2009 (KR) .......................... 10-2009-0037711
Apr. 27, 2010 (KR) .......................... 10-2010-0039181

(51) Int. Cl.
*H04W 72/00*     (2009.01)

(52) U.S. Cl.
USPC .................... 455/450; 455/435.2; 455/550.1; 455/434; 370/210; 370/218; 370/328; 370/331

(58) Field of Classification Search
None
See application file for complete search history.

(56) References Cited

U.S. PATENT DOCUMENTS

| | | | |
|---|---|---|---|
| 2003/0043736 A1* | 3/2003 | Gonda | 370/218 |
| 2004/0095901 A1* | 5/2004 | Rajkotia | 370/328 |
| 2005/0219121 A1* | 10/2005 | Chen | 342/374 |
| 2007/0242621 A1* | 10/2007 | Nandagopalan et al. | 370/254 |
| 2008/0113680 A1* | 5/2008 | Sung | 455/512 |
| 2008/0117875 A1* | 5/2008 | Bennett et al. | 370/331 |
| 2008/0130486 A1* | 6/2008 | Lim et al. | 370/210 |
| 2009/0042582 A1* | 2/2009 | Wang et al. | 455/450 |
| 2010/0008282 A1* | 1/2010 | Bhattad et al. | 370/312 |
| 2010/0203882 A1* | 8/2010 | Frenger et al. | 455/423 |
| 2011/0216817 A1* | 9/2011 | Kim et al. | 375/224 |

* cited by examiner

*Primary Examiner* — Vladimir Magloire
*Assistant Examiner* — Keith Fang

(57) ABSTRACT

A management device of a stopping or moving base station includes: an information acquisition unit that acquires first information about wireless environment from a neighboring base station and that acquires second information about the wireless environment by connecting to a backbone network; a position estimating unit that estimates a position of the neighboring base station based on the first information; and an operation condition selection unit that selects radio resources based on at least one of the first information and the second information.

20 Claims, 5 Drawing Sheets

DEVICE FOR MANAGING OF BASE STATION AND METHOD FOR MANAGING THEREOF

CROSS-REFERENCE TO RELATED APPLICATION

This application claims priority to and the benefit of Korean Patent Application Nos. 10-2009-0037711 and 10-2010-0039181 filed in the Korean Intellectual Property Office on Apr. 29, 2009 and Apr. 27, 2010, respectively, the entire contents of which are incorporated herein by reference.

TECHNICAL FIELD

The present invention relates to a management device of a base station and a method of managing the same.

BACKGROUND

In a general wireless mobile communication system, in consideration of a wireless environment, base stations are fixed and disposed as previously arranged. Such a base station is connected to a backbone network to exchange information with neighboring base stations.

However, in a wireless environment in consideration of a moving base station, it is difficult to apply a method of disposing the base station as previously arranged. In a mobile communication system including the moving base station, the wireless environment varies, and a connection that exchanges information between base stations may not exist. Therefore, in consideration of a situation where the base station moves or stops and an environment in which the base station is connected to or is not connected to a backbone network, technology in which the base station autonomously manages an operation condition is necessary.

SUMMARY

The present invention has been made in an effort to effectively manage a base station by recognizing changing wireless environment and autonomously changing a wireless operation condition.

An exemplary embodiment of the present invention provides a management device of a stopping or moving base station, including: an information acquisition unit that acquires first information about a wireless environment from a neighboring base station and that acquires second information about the wireless environment by connecting to a backbone network; a position estimating unit that estimates a position of the neighboring base station based on the first information; and an operation condition selection unit that selects radio resources based on at least one of the first information and the second information.

The first information may be information that is acquired using an over-the-air receiver (OTAR) function.

The operation condition selection unit may include a frequency and sector selection unit and a preamble selection unit.

The operation condition selection unit may select the radio resources based on a minimum distance between the base station and the neighboring base station.

The frequency and sector selection unit may select a frequency bandwidth in which the minimum distance is large, and the preamble selection unit may select a preamble in which the minimum distance is large.

The minimum distance may be a value found by multiplying $\sqrt{3}$ by a service radius of the base station.

The operation condition selection unit may select the radio resources based on the first information.

The frequency and sector selection unit may select a frequency bandwidth having a small measured value based on a maximum value or an average value of a carrier to interference noise ratio (CINR) or a received signal strength indicator (RSSI) among the first information, and the preamble selection unit may select a preamble having the small measured value.

The operation condition selection unit may select the radio resources based on a service quality estimating value.

The frequency and sector selection unit may select a frequency bandwidth in which the service quality estimating value is large, and the preamble selection unit may select a preamble in which the service quality estimating value is large.

The base station management device may further include a transmission power determining unit that determines initial transmission power based on at least one of the first information and the second information.

The initial transmission power may be determined based on a signal to interference ratio (SINR) and an RSSI that are expected in a service radius of the base station.

The transmission power determining unit may output the initial transmission power via a plurality of steps.

The base station management device may further include an antenna operation state determining unit that operates an antenna as a sector antenna or an omni antenna according to a state of the base station.

Another embodiment of the present invention provides a method of managing a management device of a stopping or moving base station, the method including: acquiring first information about a wireless environment from a neighboring base station; acquiring second information about the wireless environment by connecting to a backbone network; supplementing a history of the first information and the second information; verifying the first information and the second information; selecting information to use from the first information and the second information; selecting radio resources of the base station according to the selected information; and verifying the selected radio resources.

The verifying of the selected radio resources may include using, when a neighboring base station does not select the same radio resources, the selected radio resources; and repeating acquiring, when the neighboring base station selects the same radio resources, the first information, and acquiring the second information.

The radio resources may include a frequency, a sector, and a preamble.

The first information may be information that is acquired using an OTAR function.

DETAILED DESCRIPTION

Figure 1:
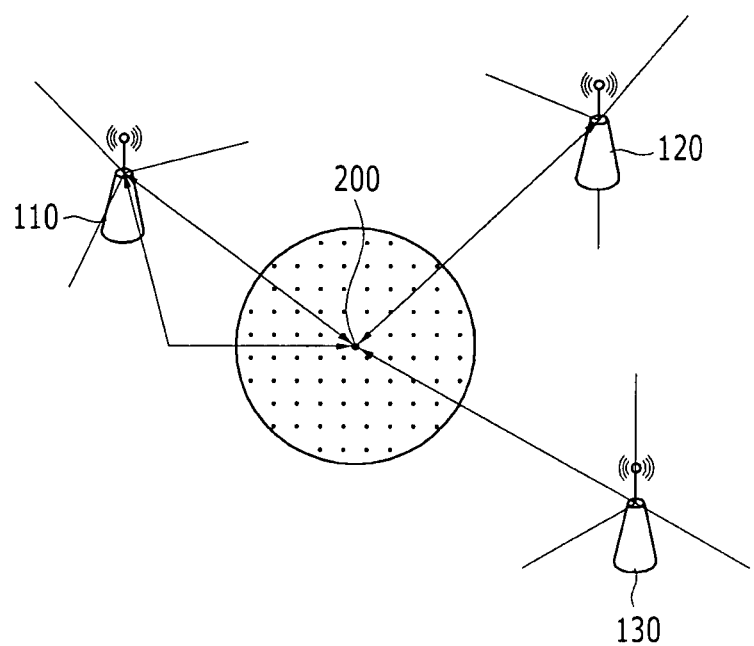
FIG. 1 is a diagram illustrating a mobile communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

In this specification, a terminal may indicate a mobile station (MS), a mobile terminal (MT), a subscriber station (SS), a portable subscriber station (PSS), user equipment (UE), an access terminal (AT), etc., and may include an entire function or a partial function of the MS, the MT, the SS, the PSS, the UE, the AT, etc.

In this specification, a base station (BS) may indicate an access point (AP), a radio access station (RAS), a node B, an evolved node B (eNodeB), abase transceiver station (BTS), a mobile multihop relay (MMR)-BS, etc., and may include an entire function or a partial function of the AP, the RAS, the node B, the eNodeB, the BTS, the MMR-BS.

Now, a device and method for managing a base station according to an exemplary embodiment of the present invention will be described in detail with reference to the drawings.

FIG. 1 is a diagram illustrating a mobile communication system according to an exemplary embodiment of the present invention.

Referring to FIG. 1, the mobile communication system includes a plurality of base stations 110, 120, and 130. Each of the base stations 110, 120, and 130 transmits and receives a wireless signal to and from a terminal (not shown) existing in a peripheral fixed area, i.e., a cell, and provides a mobile communication service. Each of the base stations 110, 120, and 130 can be moved.

The base station according to an exemplary embodiment of the present invention is positioned at a portion that is indicated by reference numeral "200" to receive a signal of the neighboring base stations 110, 120, and 130, thereby acquiring information about the wireless environment. The base station 200 can also be moved.

In this case, the base station 200 can receive a signal from the neighboring base stations 110, 120, and 130 using an over-the-air receiver (OTAR) function, which is technology for a self-configuration of the base station 200. While the base station 200 operates in an OTAR mode, the base station 200 can receive a signal of another base station, like a terminal. When the base station 200 operates in an OTAR mode, the base station 200 cannot transmit a signal.

In a method in which the base station 200 performs an OTAR function, frames of, for example, the quantity A, can be regularly formed according to a preamble of the base station 200. A frame number N and a preamble index number I are represented by Equation 1.

$$N \bmod A = I \qquad \text{[Equation 1]}$$

In a condition satisfying Equation 1, an OTAR function can be performed.

Further, in consideration of a system that is formed with cells of the quantity C that are formed with sectors of the quantity S to have preamble indexes of the total quantity S×C, the base station 200 can operate an OTAR at a position of Equation 2 using a method of connecting a frame number N and the cell.

$$N \bmod C = \text{IDCell} \qquad \text{[Equation 2]}$$

where IDCell indicates an identification (ID) of the determined cell.

Alternatively, the base station 200 may perform an OTAR function in a frame that is randomly selected without a special rule. In such a case, operation characteristics of the operating base station 200 can be changed according to characteristics of a frame that is randomly selected.

Now, a base station management device according to an exemplary embodiment of the present invention will be described in detail with reference to FIG. 2.

Figure 2:
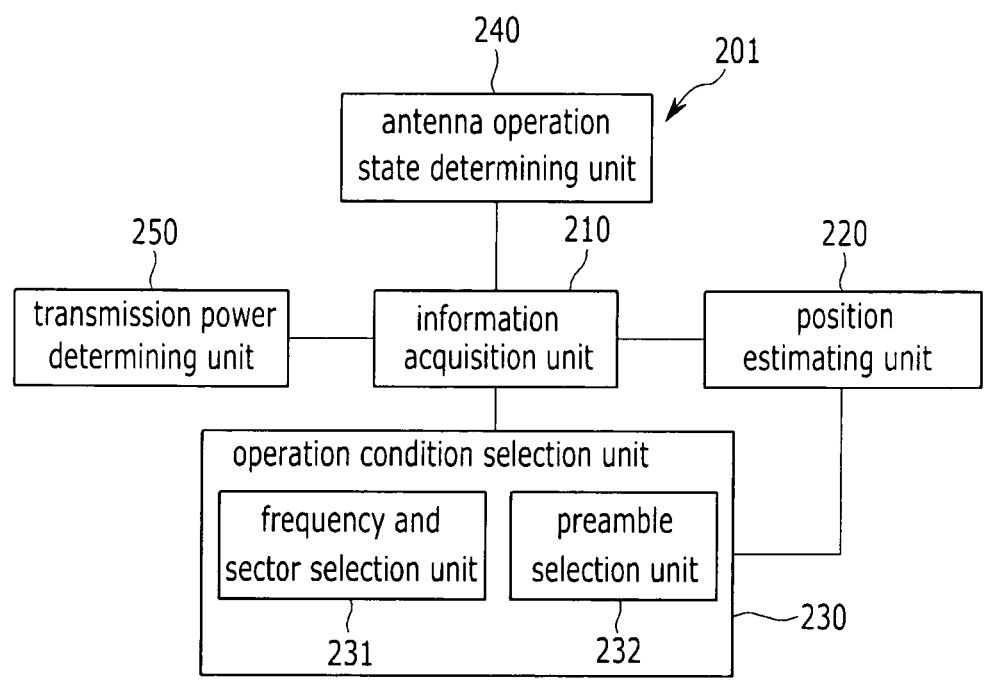
FIG. 2 is a block diagram illustrating a base station management device of a mobile communication system according to an exemplary embodiment of the present invention.

FIG. 2 is a block diagram illustrating a base station management device of a mobile communication system according to an exemplary embodiment of the present invention.

Referring to FIG. 2, a base station management device 201 is included in the base station 200 and is an device that acquires information about changing the wireless environment and that manages the base station based on the information, and includes an information acquisition unit 210, a position estimating unit 220, an operation condition selection unit 230, an antenna operation state determining unit 240, and a transmission power determining unit 250.

The information acquisition unit 210 acquires OTAR information and backbone information.

The OTAR information is information about the wireless environment that is acquired by receiving a signal from the neighboring base stations 110, 120, and 130 using the above-described OTAR function, and a carrier to interference noise ratio (CINR), a carrier to interference ratio (CIR), a received signal strength indicator (RSSI), time delay of a preamble, etc., are acquired on a preamble index basis.

The backbone information is information in which the base station 200 acquires from the neighboring base station 110, 120, and 130 that are connected to the backbone network by connecting to the backbone network, and includes a position of the neighboring base stations 110, 120, and 130, a sector antenna direction, transmission power, etc.

The position estimating unit 220 estimates a position of the neighboring base stations 110, 120, and 130 based on time delay information of OTAR information that is acquired by the information acquisition unit 210. This will be described in detail with reference to FIG. 3.

Figure 3:
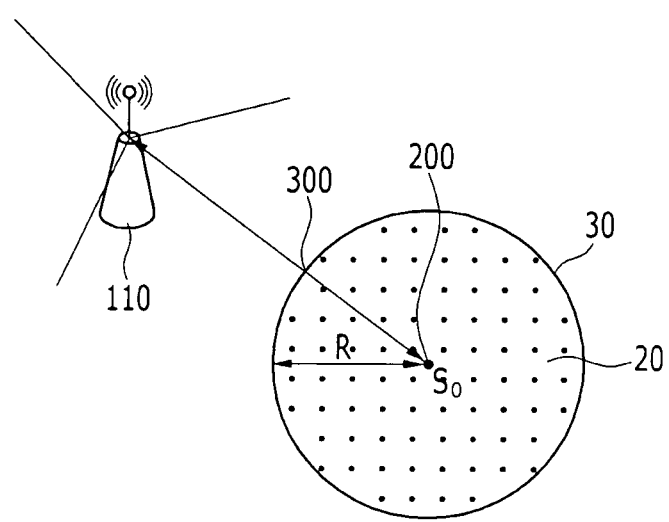
FIG. 3 is a diagram illustrating a state where a position estimating unit according to an exemplary embodiment of the present invention estimates a position of a base station.

FIG. 3 is a diagram illustrating a state where a position estimating unit according to an exemplary embodiment of the present invention estimates position of a base station.

A method of estimating a position of the neighboring base stations 110, 120, and 130 in time delay information of OTAR information that is acquired by the information acquisition unit 210 requests multiple measurement. That is, by collecting a signal that is transmitted by a target base station 100 to estimate at a plurality of positions 21, 22, and 23, time delay of measurement positions 21, 22, and 23 is checked. An equation estimating a position at a plurality of positions 21, 22, and 23 is a non-linear equation, and can be solved by a numerical value substitution method.

Further, the position estimating unit 220 can estimate a position of the neighboring base stations 110, 120, and 130 from backbone information, and can estimate a position of the target base station 100 based on information that is measured by a plurality of other base stations and information that is measured by the base station 200. In this case, the base station 200 shares and exchanges a position measurement result of the target base station 100 with at least two other base stations, thereby generating at least three measurement information sets together with a result that is measured by the base station 200.

Figure 4:
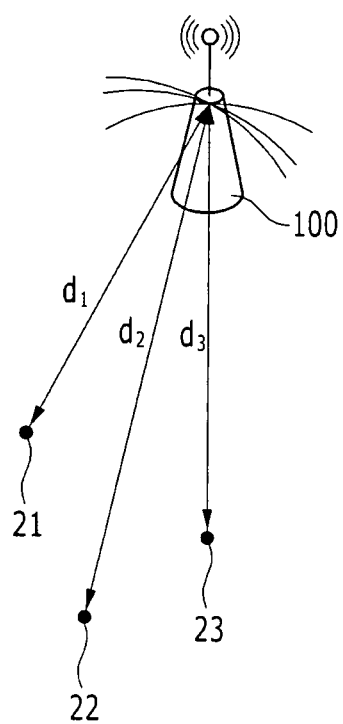
FIG. 4 is a diagram illustrating a state where a base station management device according to an exemplary embodiment of the present invention estimates a service quality.

When the base station 200 is not connected to a backbone network, the base station 200 cannot collect measurement information from the backbone network and thus a position of the target base station 100 can be estimated by performing measurement a plurality of times at a plurality of positions 21, 22, and 23, as shown in FIG. 4.

The operation condition selection unit 230 performs a base station configuration by selecting a base station operation condition based on information that is acquired by the information acquisition unit 210. The operation condition selection unit 230 includes a frequency and sector selection unit 231 and a preamble selection unit 232.

The operation condition selection unit 230 can select an operation condition based on a minimum distance between the base station 200 and the neighboring base stations 110, 120, and 130, and this will be described first.

When a frequency reuse factor (FRF) is not applied, the frequency and sector selection unit 231 acquires a minimum distance Dm (hereinafter referred to as a "minimum distance") that should be sustained between the base station 200 and the neighboring base stations 110, 120, and 130 on a frequency bandwidth basis, and selects a frequency bandwidth having a large minimum distance Dm. In this case, the minimum distance Dm is determined by Equation 3.

$$Dm = \sqrt{3} * R \quad \text{[Equation 3]}$$

where R is a service radius of the base station 200.

When a frequency reuse factor is not applied, the preamble selection unit 232 acquires a minimum distance Dm on a preamble index basis and selects a preamble index having a large minimum distance Dm. When minimum distances Dm are identical on a preamble index basis, the preamble selection unit 232 randomly selects a preamble index.

When a frequency reuse factor is applied, the frequency and sector selection unit 231 selects a frequency/sector having a large minimum distance Dm on a frequency/sector basis.

When a frequency reuse factor is applied, the preamble selection unit 232 acquires a minimum distance Dm on a preamble index basis corresponding to the selected factor, and selects a preamble index having a large minimum distance Dm. When minimum distances Dm are identical on a preamble index basis, the preamble selection unit 232 randomly selects a preamble index.

The operation condition selection unit 230 can select an operation condition based on OTAR information, and this will be described hereinafter.

When a frequency reuse factor is not applied, the frequency and sector selection unit 231 acquires a maximum value or an average value (hereinafter referred to as a "measured value") of a CINR value or an RSSI value among OTAR information on a frequency band basis, and selects a frequency band having a small measured value.

When a frequency reuse factor is not applied, the preamble selection unit 232 acquires a measured value on a preamble index basis, selects a preamble index having a small measured value, and randomly selects a preamble index when measured values are identical.

When a frequency reuse factor is applied, the frequency and sector selection unit 231 acquires a measured value on a frequency and sector basis, and selects a frequency and a sector having a small measured value.

When a frequency reuse factor is applied, the preamble selection unit 232 acquires a measured value on a preamble index basis corresponding to the selected factor, selects a preamble index having a small measured value, and randomly selects a preamble index when measured values are identical.

The operation condition selection unit 230 can select an operation condition based on service quality estimation information, and this will be described hereinafter with reference to FIG. 4.

FIG. 4 is a diagram illustrating a state where a base station management device according to an exemplary embodiment of the present invention estimates service quality.

Service quality estimation is to estimate service quality in an area that is scheduled to provide a service using operation information of the neighboring base station 110, i.e., position, transmission power, a sector antenna direction, etc. A service quality estimation value (SQEV) is defined as an estimated average CINR value in a service radius area.

FIG. 4 illustrates an example in which the base station 200 that provides a service radius R at a point So estimates service quality.

When a frequency reuse factor is not applied, the frequency and sector selection unit 231 acquires a service estimating value on a frequency bandwidth basis, and selects a frequency bandwidth having a large service estimating value.

When a frequency reuse factor is not applied, the preamble selection unit 232 acquires a service estimating value on a preamble index basis, selects a preamble index having a large service estimating value, and randomly selects a preamble index when service estimating values are identical.

When a frequency reuse factor is applied, the frequency and sector selection unit 231 acquires a service estimating value on a frequency and sector basis, and selects a frequency and a sector having a large service estimating value.

When a frequency reuse factor is applied, the preamble selection unit 232 acquires a service estimating value on a preamble index basis corresponding to the selected sector and selects a preamble index having a large measured value, and randomly selects a preamble index when measured values are identical.

Referring again to FIG. 2, the antenna operation state determining unit 240 operates a sector antenna or an omni antenna in a state where the base station 200 moves or is fixed. The antenna operation state determining unit 240 operates as a sector antenna in a state where the base station 200 is fixed, and operates as an omni antenna in a state where the base station 200 moves.

In a sector antenna operation state, the base station 200 measures OTAR information and selects sector radio resources, and in an omni antenna operation state, the base station 200 measures OTAR information and selects radio resources.

In a sector antenna operation state, radio resources can be changed in the sector antenna on a sector basis.

In an omni antenna operation state, radio resources can be changed.

The transmission power determining unit 250 determines initial transmission power of the base station 200. Specifically, the transmission power determining unit 250 can set initial transmission power of the base station 200 to maximum power that the base station 200 can transmit.

Alternatively, the transmission power determining unit 250 can determine initial transmission power by assuming a path loss model of a radio channel in consideration of a virtual service radius R of the base station 200. In this case, the transmission power determining unit 250 determines transmission power so that a signal to interference ratio (SINR) becomes a target value or more at all points within the service radius R.

Specifically, when the transmission power determining unit 250 does not recognize positions of the neighboring base stations 110, 120, and 130, the transmission power determining unit 250 can determine initial transmission power based on time delay and OTAR information. Such a method determines initial transmission power based on all the received signal values, not a reception value of each of the neighboring base stations 110, 120, and 130 in the received signal, and thus supplements a drawback that does not consider a position of the neighboring base stations 110, 120, and 130.

When only the neighboring base station 110 is considered, initial transmission power $P_{TX}$ is represented by Equation 4.

$$P_{TX} = SINR_{TARGET} + RSSI + A + B\log_{10}\left(\frac{d_1 \times R}{d_1 - R}\right)$$ [Equation 4]

where RSSI is a size of the received signal in which the base station 200 that determines initial transmission power acquires as OTAR information, $SINR_{TARGET}$ is a target SINR value that is expected in the service radius R, $d_1$ is a distance between the base station 200 and the base station 110, and a channel path loss model is represented by A+B log 10 (d).

The transmission power determining unit 250 calculates initial transmission power $P_{TX}$ of each of the neighboring base stations 110, 120, and 130, and determines a maximum value thereof as initial transmission power of the base station 200.

Alternatively, when the transmission power determining unit 250 recognizes all positions of the neighboring base stations 110, 120, and 130, the transmission power determining unit 250 can determine initial transmission power based on a coordinate of the neighboring base stations 110, 120, and 130, OTAR information, and an antenna direction of the sector antenna. In this case, the transmission power determining unit 250 determines initial transmission power that is estimated to be $SINR_{TARGET}$ or more at all positions within a virtual service radius R in consideration of all of the neighboring base stations 110, 120, and 130.

When the transmission power determining unit 250 outputs transmission power of the base station 200 via a plurality of steps, the transmission power determining unit 250 can determine power at each step.

Transmission power P(n) at the n-th step can set a list of terminals in which the base station 200 should provide a service and a list of terminals in which a service is not presently provided, except for a terminal that is serviced in the transmitting base station 200 and a terminal that is managed by the neighboring base stations 110, 120, and 130, which is an option. Transmission power P(n+1) at the (n+1)-th step is determined based on a list of terminals in which a service is not provided and a measured value that is reported in the terminal.

For example, a condition in which a terminal in which a service is not provided exists or a condition that increases transmission power is represented by Equation 5.

$$P(n+1)=P(n)+\square Pup$$ [Equation 5]

For example, a condition in which all terminals are serviced and in which transmission power is not adjusted is represented by Equation 6.

$$P(n+1)=P(n)$$ [Equation 6]

For example, a condition in which all terminals are serviced and in which transmission power should be reduced is represented by Equation 7.

$$P(n+1)=P(n)-Pdown$$ [Equation 7]

In this case, initial transmission power, i.e., transmission power P(0) at first step follows initial transmission power that is determined as a measurement base or initial transmission power that is determined as an estimation base, as described above. When initial transmission power is not determined, initial transmission power is determined by Equation 8.

$$P(0)=Pf+Pr$$ [Equation 8]

where Pf is a fixed power value based on a service radius, and Pr is reception power that is measured at a position of the base station 200.

Now, a method in which a base station management device according to an exemplary embodiment of the present invention manages a base station will be described in detail with reference to FIG. 5.

Figure 5:
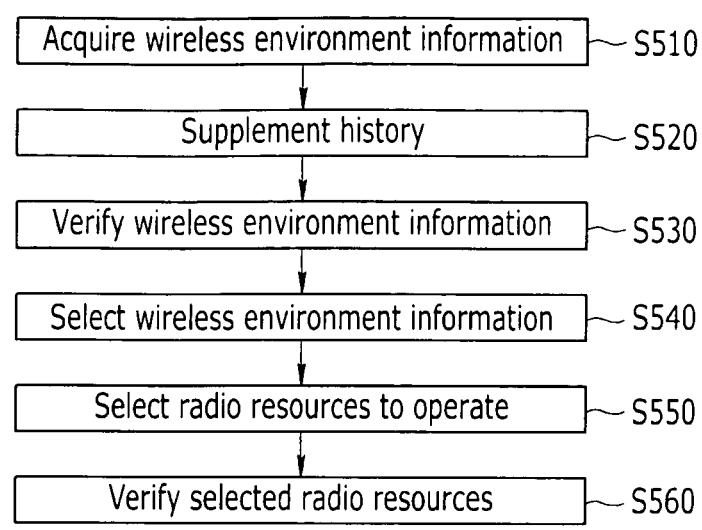
FIG. 5 is a flowchart illustrating a method of managing a base station according to an exemplary embodiment of the present invention.

FIG. 5 is a flowchart illustrating a method of managing a base station according to an exemplary embodiment of the present invention.

Referring to FIG. 5, a base station management device 201 acquires wireless environment information (S510). In this case, wireless environment information that is acquired by the base station management device 201 may be OTAR information acquired using an OTAR function or backbone information, which is operation information of the neighboring base stations 110, 120, and 130 that is obtained by exchanging a message with the neighboring base stations 110, 120, and 130 by connecting to a backbone network. The operation information of the neighboring base stations 110, 120, and 130 may be a position of the neighboring base stations 110, 120, and 130, a sector antenna direction, and radio resource information and transmission power on an omni or sector basis.

Thereafter, the base station management device 201 supplements history of the acquired wireless environment information (S520). When wireless environment information that is acquired by the base station management device 201 is recent, the wireless environment information has a meaning and measured values that may be different according to position. Therefore, a process of supplementing the history of wireless environment information on a position and time basis is necessary. Next, as shown in Table 1, the history of wireless environment information can be stored.

TABLE 1

| Classification | Information |
| --- | --- |
| [base station identifier][sector] | position (x, y)<br>radio resource(frequency and preamble index)<br>sector antenna direction<br>transmission power<br>information exchange time |

Further, actually acquired wireless environment information may be stored and a history thereof may be managed, as shown in Table 2.

TABLE 2

| Classification | Sub-classification | Information |
|---|---|---|
| [position] [time] | [frequency][preamble index] | time delay |
| | | measurement signal(CINR) |
| | | measurement signal(RSSI) |

Thereafter, the base station management device 201 verifies the acquired wireless environment information (S530). That is, as shown in Table 2, the base station management device 201 determines whether wireless environment information history that is acquired by time delay information is effective through the stored history. A case where such verification is requested is a case of acquiring and using wireless environment information in a stopped state where the base station 200 is not connected to a backbone network and in a state where the base station 200 moves. Further, even in a case where the base station 200 is connected to the backbone network, when the acquired wireless environment information is different from history information, it is assumed that a state where the base station 200 moves and a verification process can be performed. The verified wireless environment information can be represented as shown Table 3.

TABLE 3

| Classification | Sub-classification | Information |
|---|---|---|
| [time] | [frequency][preamble index] | time delay (recent measured position) |
| | | position(x, y)(a plurality of measured values that are used for estimation-measured position time delay) |

Thereafter, the base station management device 201 selects wireless environment information (S540). A state of the base station 200 sequentially varies and thus information that is connected to and that is exchanged with the backbone network also varies, and when the base station 200 is not connected to the backbone network, reliability of the exchanged information is reduced. Therefore, a process of selecting wireless environment information that varies according to a situation is necessary.

TABLE 4

| Preferential order | Information acquisition | Verification |
|---|---|---|
| 1 | exchange of backbone network | measurement |
| 2 | exchange of backbone network | — |
| 3 | measurement | measurement |
| 4 | history of backbone network | measurement |
| 5 | measurement history | measurement |
| 6 | history of backbone network | — |
| 7 | measurement history | — |

Table 4 represents a preferential order of acquired wireless environment information. Wireless environment information can be greatly classified into information (exchange of a backbone network) that is exchanged in the backbone network, information (measurement) that is measured by an OTAR function, information that is acquired from a history of the backbone network (history of a backbone network), and information that is acquired from a measurement history (measurement history) by an OTAR function. A preferential order can be provided, as shown in Table 4 according to such a classification.

Thereafter, the base station management device 201 selects radio resources to operate according to the selected wireless environment information (S550). This step can be applied to a description of the operation condition selection unit 230 that is described above.

Thereafter, the base station management device 201 performs a verification process of the selected radio resources (S560). That is, when it is measured that the neighboring base stations 110, 120, and 130 do not select the same radio resources, the base station management device 201 continues to use the selected radio resources. When the neighboring base stations 110, 120, and 130 select the same radio resources and it is estimated that wireless environment is bad, step (S510) of acquiring wireless environment information can be performed. In this case, the following steps S520-S560 are repeated.

According to the present invention, by recognizing the wireless environment in which a base station changes and autonomously changing a wireless operation condition, the base station can be effectively managed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A management device of a stopped or moving base station, the management device comprising:
    an information acquisition unit configured to:
        acquire first information about a wireless environment from a neighboring base station;
        acquire second information about the wireless environment through a backbone network; and
        determine whether the acquired first information and the acquired second information have a specified level of effectiveness;
    a position estimating unit configured to estimate a position of the neighboring base station based on the first information; and
    an operation condition selection unit configured to:
        select one of the first information and the second information according to a preferential order of one or more sources of the first information and the second information, the preferential order of the sources determined according to at least one of whether or not the information is measured by an over-the-air receiver (OTAR) function, whether or not the information comprises current or historical information, and whether the information is measured by the portable base station or the neighboring base station; and
        allocate radio resources based on the selected one of the first information and the second information.

2. The base station management device of claim 1, wherein the first information includes information that is configured to be acquired using the OTAR function.

3. The base station management device of claim 1, wherein the operation condition selection unit comprises:
    a frequency and sector selection unit; and
    a preamble selection unit.

4. The base station management device of claim 3, wherein the operation condition selection unit is configured to select the radio resources based on a minimum distance between the base station and the neighboring base station.

5. The base station management device of claim 4, wherein the frequency and sector selection unit is configured to select a frequency bandwidth in which the minimum distance is large, and the preamble selection unit is configured to select a preamble in which the minimum distance is large.

6. The base station management device of claim 4, wherein the minimum distance includes a value found by multiplying $\sqrt{3}$ by a service radius of the base station.

7. The base station management device of claim 3, wherein the operation condition selection unit is configured to select the radio resources based on the first information.

8. The base station management device of claim 7, wherein the frequency and sector selection unit is configured to select a frequency bandwidth having a small measured value based on a maximum value or an average value of a carrier to interference noise ratio (CINR) or a received signal strength indicator (RSSI) among the first information, and wherein the preamble selection unit is configured to select a preamble having the small measured value.

9. The base station management device of claim 3, wherein the operation condition selection unit is configured to select the radio resources based on a service quality estimating value.

10. The base station management device of claim 9, wherein the frequency and sector selection unit is configured to select a frequency bandwidth in which the service quality estimating value is large, and wherein the preamble selection unit is configured to select a preamble in which the service quality estimating value is large.

11. The base station management device of claim 1, further comprising a transmission power determining unit configured to determine an initial transmission power based on at least one of the first information and the second information.

12. The base station management device of claim 11, wherein the transmission power determining unit is configured to determine the initial transmission power based on a signal to interference ratio (SINR) and an RSSI that are expected in a service radius of the base station.

13. The base station management device of claim 11, wherein the transmission power determining unit is configured to output the initial transmission power via a plurality of steps.

14. The base station management device of claim 1, further comprising an antenna operation state determining unit that is configured to operate an antenna as a sector antenna or an omni antenna according to a state of the base station.

15. A method of managing a management device of a stopping or moving base station, the method comprising:
acquiring first information about a wireless environment from a neighboring base station;
acquiring second information about the wireless environment through a backbone network;
verifying that the first information and the second information have a specified level of effectiveness;
selecting one of the first information and the second information according to a preferential order of one or more sources of the first information and the second information, the preferential order of the sources determined according to at least one of whether or not the information is measured by an over-the-air receiver (OTAR) function, whether or not the information comprises current or historical information, and whether the information is measured by the portable base station or the neighboring base station;
allocating radio resources of the base station according to the selected one of the first information and the second information; and
verifying the selected radio resources.

16. The method of claim 15, wherein the verifying of the selected radio resources comprises:
using the selected radio resources when a neighboring base station does not select the same radio resources; and
repeating acquiring the first information when the neighboring base station selects the same radio resources, and acquiring the second information.

17. The method of claim 15, wherein the radio resources comprise a frequency, a sector, and a preamble.

18. The method of claim 15, wherein the first information includes information that is acquired using the OTAR function.

19. The base station management device of claim 1, further comprising third information associated with a history of the wireless environment, the operation condition selection unit configured to select one of the first information, the second information, and the third information according to the preferential order of the first information, the second information, and the third information.

20. The method of claim 15, wherein the selecting one of the first information, the second information further comprises selecting one of the first information, the second information, and a third information according to a preferential order of the first information, the second information, and the third information, the third information including a history of the wireless environment.

* * * * *